United States Patent [19]

Mittelstadt et al.

[11] Patent Number: 4,475,976
[45] Date of Patent: Oct. 9, 1984

[54] METHOD AND APPARATUS FOR FORMING COMPOSITE MATERIAL ARTICLES

[75] Inventors: Robert F. Mittelstadt, Auburn; George R. Stumpf, Jr., Seattle, both of Wash.

[73] Assignee: The Boeing Company, Seattle, Wash.

[21] Appl. No.: 565,187

[22] Filed: Dec. 23, 1983

[51] Int. Cl.³ .......................................... B29H 17/36
[52] U.S. Cl. .................................. 156/286; 100/211; 156/221; 156/222; 156/382; 264/258; 264/314; 264/316; 425/389
[58] Field of Search ........ 156/212, 213, 382, 285–286, 156/221, 222, 224, 226; 264/313, 314, 316, 258; 425/389, 390; 100/211

[56] References Cited

U.S. PATENT DOCUMENTS

| | | | |
|---|---|---|---|
| 2,342,988 | 2/1944 | Vidal | 264/316 |
| 2,385,083 | 9/1945 | Kemerer | 264/316 |
| 2,401,299 | 6/1946 | Glavin | 264/314 |
| 2,441,097 | 5/1948 | Hicks | 264/316 |
| 2,510,215 | 6/1950 | Pityo et al. | 156/221 |
| 2,531,218 | 11/1950 | Johnson | 264/314 X |
| 2,975,476 | 5/1961 | Burke | 264/314 X |
| 2,978,376 | 4/1961 | Hulse | 156/222 |
| 3,025,208 | 3/1962 | Geiger | 156/382 |
| 3,128,322 | 4/1964 | Young | 264/314 |
| 3,146,143 | 8/1964 | Bolesky et al. | 156/285 X |
| 3,546,740 | 12/1970 | Johnson | 264/314 |
| 3,576,930 | 4/1971 | Watters et al. | 264/314 |
| 3,614,811 | 10/1971 | Johnson | 264/314 X |
| 3,642,975 | 2/1972 | Duggins et al. | 264/314 |
| 3,967,996 | 7/1976 | Kamov et al. | 156/156 |
| 4,301,099 | 11/1981 | Broeksema et al. | 264/25 |

Primary Examiner—David A. Simmons
Attorney, Agent, or Firm—Joan H. Pauly; Delbert J. Barnard

[57] ABSTRACT

A ply (100) of fiber reinforced composite material is laid onto a mandrel (30) having a vacuum ported upper surface with a generally U-shaped cross section. Ply (100) is laid onto the top web (32) of mandrel (30), with its side edges being laid in a cantilevered fashion. A flexible bag (20) is inflated into a stretched condition and lowered over mandrel (30). Bag (20) rolls over mandrel (30) to form play (100) down over mandrel (30). As bag (20) rolls over mandrel (30), it folds ply (100) along two contoured bend lines between the web (32) and flanges (34, 36) of mandrel (30) and simultaneously restrains ply (100) from folding along a straight line. Bag (20) engages a seal (38) carried by mandrel (30). A vacuum is applied through mandrel (30) to evacuate the area between bag (20) and mandrel (30) within seal (38), to compact ply (100). Each ply of composite material is formed and compacted before laying another ply.

8 Claims, 12 Drawing Figures

METHOD AND APPARATUS FOR FORMING COMPOSITE MATERIAL ARTICLES

DESCRIPTION

1. Technical Field

This invention relates to methods and apparatus for forming and compacting composite material articles and, more particularly, to such a method and apparatus which are mechanized and in which each ply of a fiber reinforced composite material is formed and compacted on a mandrel before laying the next ply on the mandrel.

2. Background Art

In the manufacture of modern aircraft, the use of composite materials to fabricate components of the aircraft is becoming increasingly widespread. One type of aircraft structure that may be fabricated from a composite material is a frame member, such as a stringer, that is channeled to form a generally U-shaped cross section. Such frame members may be fabricated by laying a series of plies of prepreg tape over a lay-up mandrel. The plies of the prepreg tape are laid one at a time and must be formed and compacted against the lay-up mandrel prior to the application of any additional plies. In the case of a ply that will have a generally U-shaped cross section in the finished article, the flat tape that is to form the ply must be bent and formed to conform to the contour of the lay-up mandrel prior to the compaction of the ply. The compaction of each ply serves to remove all the entrapped air between the mandrel and the ply in order to produce a void free lay-up. Therefore, the compaction of each ply must be performed before the addition of the next ply.

The conventional technique for compacting or debulking each ply is a manual procedure in which the article being fabricated is bagged with an airtight plastic film. This film is placed over the mandrel manually, and its edges are manually sealed with a vacuum sealant. A vacuum is then applied between the ply being compacted and the plastic film. Atmospheric pressure against the outside of the plastic film provides the compaction force while the vacuum removes the entrapped air. This procedure has the serious disadvantages of being very time consuming and of requiring considerable operator skill when contoured parts, such as channel stringers, are being compacted. The operator must not only ensure that a good edge seal has been obtained, but also must ensure that there are no large wrinkles or bridging in the plastic film. "Bridging" indicates an area where the film does not contact the lay-up mandrel or the ply being compacted. Wrinkles and bridging result in areas of the ply which are not reliably compacted.

Another serious problem encountered when the conventional manual technique for compacting is used is that it is extremely difficult to form bend lines that are not straight lines. Such bend lines are required, for example, in the fabrication of a channel stringer having contoured bend lines between its web and flange portions. When the conventional technique for compacting is used, there is a tendency for the tape to buckle or distort along the bend lines since the tape has a natural tendency to form a bend along a straight line. It requires a great deal of operator time and skill to form the tape to the desired contour without the tape buckling or distorting. If buckles and wrinkles or other distortions do form, they must be worked out by hand. This further adds to the time required to complete the compacting process. Thus, the conventional technique for compacting is very expensive to carry out because of the large amount of skilled labor required and because of the unavailability of the apparatus used for other purposes during the entire lengthy lay-up process.

The patent literature includes a number of examples of methods and apparatus for forming a single layer or multiple layers of material over a mold surface. The following U.S. Pat. Nos. each disclose a method and/or apparatus in which sheet material and a mold surface are placed in a chamber which is pressurized to force a membrane or diaphragm over the mold surface to in turn form the sheet material to the contour or shape of the mold surface: 2,342,988, granted Feb. 29, 1944, to E. L. Vidal; 2,385,083, granted Sept. 18, 1945, to D. C. Kemerer; 2,401,299, granted June 4, 1946, to R. E. Glavin; 3,546,740, granted Dec. 15, 1970, to H. G. Johnson; 3,614,811, granted Oct. 26, 1971, to H. G. Johnson; 3,642,975, granted Feb. 15, 1972, to R. B. Duggins et al; and 3,967,996, granted July 6, 1976, to N. I. Kamov. The Kemerer patent and the two Johnson patents disclose procedures in which a single sheet of material, such as a metal sheet, is formed. Each of the other patents discloses a process in which a plurality of layers are formed against a mold surface during a single forming process. Duggins et al disclose an alternative process in which a plunger is urged against a membrane to form the membrane into the desired shape and urge it against the work material which is in turn urged against a mold surface. The plunger is perforated to provide openings for a vacuum that serves to control the shape of the membrane so that it conforms to the shape of the plunger. In Johnson U.S. Pat. No. 3,546,740, the space between the die and the sheet of material being formed is evacuated during the forming process to permit accurate formation of the article. The space is evacuated through the die which is porous.

The use of a vacuum in the process of forming sheet material is disclosed in U.S. Pat. Nos. 2,441,097, granted May 4, 1948, to J. S. Hicks; 2,978,376, granted Apr. 4, 1961, to G. Hulse; and 3,546,740, granted Dec. 15, 1970, to H. G. Johnson. In the Hicks patent, a membrane is secured to a die and forms one wall of a chamber that contains a fibrous mat to be formed and a die mold surface. During the forming process, a vacuum is used to evacuate the area between the membrane and the fibrous mat and between the fibrous mat and the mold surface to urge the fibrous mat into contact with the mold surface. In the Hulse patent, a mold box and three sheets of material to be formed together form a chamber. A mold having a number of perforations is placed inside the chamber. The chamber is evacuated to draw the three sheets of material onto the mold surface to form the sheets into a laminated chair. The use of a vacuum in the device disclosed by Johnson U.S. Pat. No. 3,546,740 is described above.

In U.S. Pat. No. 3,128,322, granted Apr. 7, 1964, to R. E. Young, a process for forming a single layer of fibrous material impregnated with a resin is described. The material is placed over a convex mold surface, and an inflated flexible bag is lowered over the material and the mold. The bag progressively envelops the mold and is described as squeezing out air and excess binder and smoothing out wrinkles as the contact with the sheet of fibrous material spreads from the center of the mold. The sheet of material, before being formed, is fabricated on a cylindrical mandrel and then cut into a sheet to be placed on the mold. The mold includes heaters to heat and cure the layer of material while the bag is in contact.

U.S. Pat. No. 2,510,215, granted June 6, 1950, to A. F. Pityo et al discloses a process in which a yieldable plunger forces a circular blank of material against a female die during the manufacture of a globe hemisphere. In U.S. Pat. No. 3,576,930, granted Apr. 27, 1971, to L. H. Watters et al, a process of preparing molded articles is described in which the article is formed on a flexible mold member which is forced down into a rigid bowl-like support member. At the end of the process, a fluid pressure is applied between the rigid support member and the flexible mold member to move the flexible mold member away from the support member preceeding the removal of the molded article from the flexible mold member. U.S. Pat. No. 4,301,099, granted Nov. 17, 1981, to E. Broeksema et al, discloses a method and device for manufacturing a plastic record carrier. In the manufacturing process, a flexible substrate is pressed against a mold with a liquid resin between the substrate and the mold. The resin spreads out, and the finished product has two layers of a substrate and the resin.

The above patents and the prior art that is discussed and/or cited therein should be studied for the purpose of putting the present invention into proper perspective relative to the prior art.

DISCLOSURE OF THE INVENTION

A subject of the invention is apparatus for forming a composite material article having a desired shape. According to an aspect of the invention, the apparatus comprises a mandrel having a vacuum ported upper surface portion that conforms to the desired shape of the article. A seal is carried by the mandrel and surrounds the perimeter of the upper surface portion of the mandrel. The apparatus also includes a flexible bag and inflating means for inflating the bag into a stretched condition. Lowering means is provided for lowering the bag in such stretched condition over the upper surface portion of the mandrel and into sealing engagement with the seal, to form a ply of fiber reinforced composite material that has been laid on such upper surface portion to the shape of the upper surface portion, and for raising the bag out of contact with the mandrel. Vacuum means evacuates, through said upper surface portion of the mandrel, the area between the bag and the mandrel and within the seal, to compact said ply.

According to a preferred aspect of the invention, said upper surface portion of the mandrel is contoured. The contoured upper surface portion may include an elongated contoured bend line. According to another preferred aspect of the invention, the upper surface portion of the mandrel is generally U-shaped in cross section, with a top generally horizontal web and two side generally vertically flanges. The seal is generally saddle-shaped. In the preferred embodiment, there is an elongated contoured bend line between the web and each flange.

Another subject of the invention is a method of forming a composite material article. According to an aspect of the invention, the method comprises laying a ply of fiber reinforced composite material onto a vacuum ported mandrel having a shape conforming to the desired shape of the article. A flexible bag is inflated into a stretched condition. The inflated bag is lowered over the mandrel to form the ply to the shape of the mandrel, and a portion of the bag is brought into sealing engagement with a seal carried by the mandrel around the perimeter of the ply. A vacuum is applied through the mandrel to the area between the bag and the mandrel and within the seal to compact the ply. The bag is raised to take it out of contact with the mandrel and the ply. Additional plies of fiber reinforced composite material are laid as necessary to obtain a desired thickness. Each such additional ply is formed and compacted before laying another ply.

Preferably, the step of lowering the bag to form the ply includes allowing portions of the bag to unstretch to prevent formation of wrinkles, and allowing other portions of the bag to stretch further to prevent bridging. Also preferably, such step includes allowing the bag to roll over essentially the entire length of an elongated contoured bend line on the mandrel essentially simultaneously, to fold the ply along the bend line and at the same time restrain the ply from folding along a straight line.

The method and apparatus of the invention provide improved means for forming and compacting composite material articles that avoids the problems discussed above in connection with conventional fabrication techniques. Since all the layers of the article may be laid, formed, and compacted on a single mandrel and since the forming and compacting procedures are mechanized, the forming of the article using the method and apparatus of the invention may be carried out relatively quickly and with a minimal amount of skill of the operator. The savings in time and the absence of a need for skilled labor results in considerable savings in the cost of the operation.

The mechanization of the method and the apparatus of the invention also avoids the problems of wrinkling, bridging, and difficulty in forming bend lines discussed above. These problems are avoided without the intervention of expensive skilled labor. As the bag is lowered over the mandrel and the mandrel penetrates the bag, the bag rolls over the mandrel surface and the ply of composite material, forming the ply as it moves. When the bag rolls over contours, there are certain areas where there is excessive bag material. The inflating of the bag into a stretched condition before lowering it prevents wrinkles from appearing in such areas since the excess bag material in such areas is taken up by the bag unstretching in such areas. In areas where bridging might otherwise occur, the flexible bag is stretched by the inflating fluid therein to prevent bridging and provide contact in the area subject to bridging. The fluid pressure in the inflated bag also holds the bag against the seal to provide an automatic and reliable seal.

The rolling action of the bag over the mandrel results in essentially the entire length of any contoured bend lines being formed at essentially the same time. Thus, the bag restrains the ply of material from folding in a straight line, and the bend line is controlled to follow the contour of the mandrel. It is not possible to achieve such simultaneous folding or bending and restraining action by a hand forming operation.

In summary, the method and apparatus of the invention provide a relatively quick and inexpensive means for reliably and accurately forming a composite material article. In addition, the method and apparatus are applicable to a wide variety of composite material shapes, including elongated channel members having contoured bend lines.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 9:
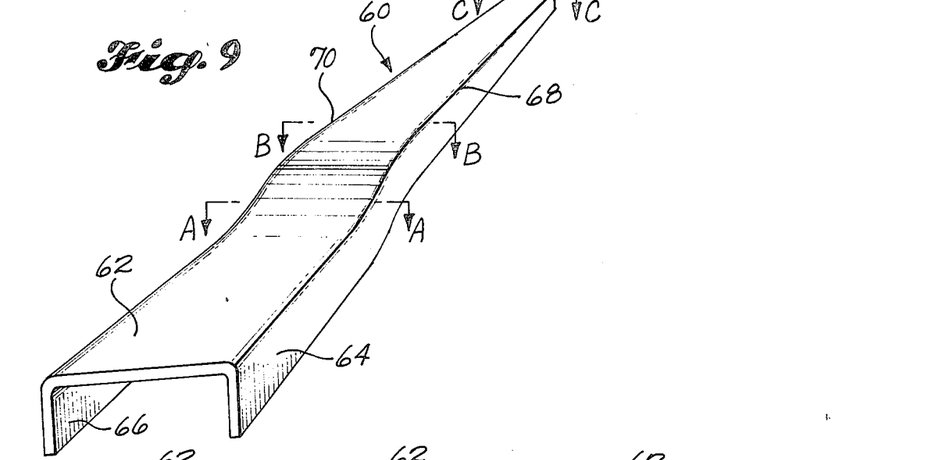
FIG. 9 is a pictorial view of a finished channel stringer formed by the apparatus shown in FIGS. 1-8.
Figures 9A, 9B, 9C:
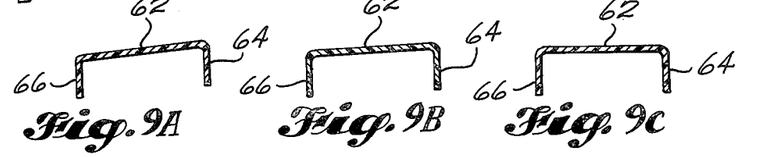
FIGS. 9A-9C are sectional views taken along the lines A—A, B—B and C—C, respectively, in FIG. 9.

The drawings show apparatus that is constructed according to the invention and that also constitutes the best mode of the apparatus of the invention currently known to the applicant. The forming process and the apparatus illustrated in the drawings is designed for use in the forming of elongated channel stringers such as that shown in FIG. 9. It is anticipated that one of the primary uses of the method and apparatus of the invention will be to form and compact such elongated contoured members. However, it is of course to be understood that the method and apparatus of the invention may also be used to great advantage in the fabrication of composite material articles of other shapes and sizes.

Figure 1:
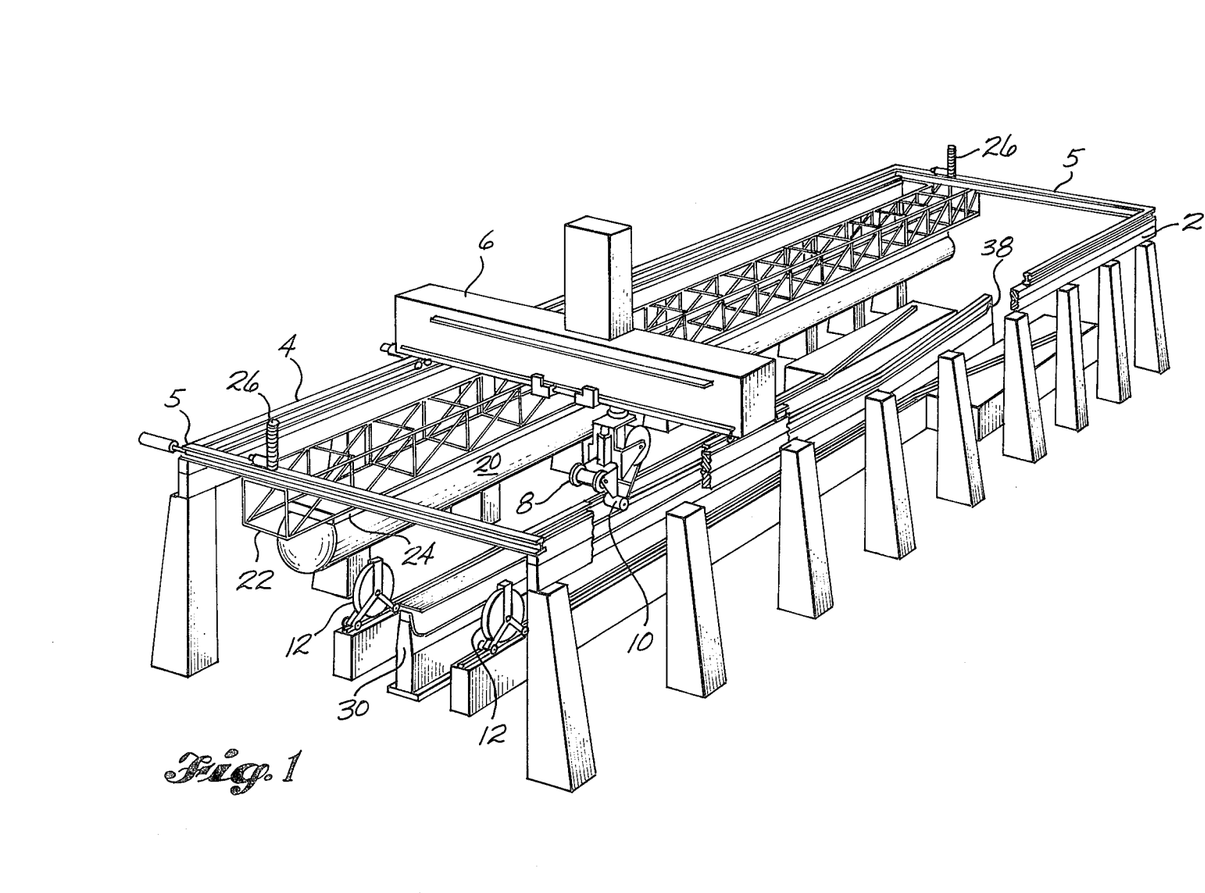
FIG. 1 is a pictorial view of tape laying apparatus incorporating the preferred embodiment of the apparatus of the invention and showing a ply of tape being laid on the mandrel.
Figure 8:
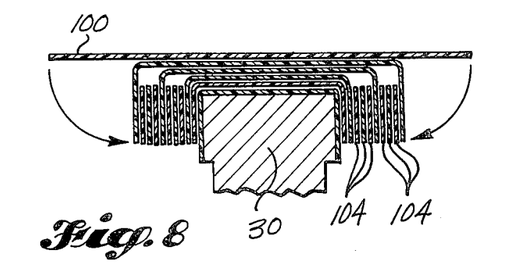
FIG. 8 is a sectional view of the mandrel shown in FIGS. 1-7 with a number of plies of material formed and compacted thereon and a ply of material laid thereon ready to be formed and compacted.

Referring to FIG. 1, the structure shown includes a number of features that are well-known in the art. The structure includes two side rails 2, 4 along and between which a gantry 6 moves horizontally. A tape laying head 8 is carried by the gantry 6 and is movable along the gantry 6 in a horizontal direction perpendicular to the side rails 2, 4. This type of arrangement is known in the art and permits the accurate positioning of the tape laying head at the beginning of a tape course. The tape laying head 8 carries a roller 10 which presses on a piece of tape to urge the tape against the mandrel 30 and lay the tape on the mandrel 30. The structure shown in FIG. 1 also includes two side ply dispensing heads 12. These heads 12 are used for dispensing plies of tape that cover the flange portions of the finished article but not the web portion. These side plies are subsequently hand applied along the generally vertical surfaces of the mandrel 30. Such side plies of tape are illustrated in FIG. 8 and designated by the reference numeral 104.

The apparatus of the invention includes a mandrel that has an upper surface portion that conforms to the desired shape of the article to be formed. In the preferred embodiment shown in the drawings, this upper surface of the mandrel 30 has a generally U-shaped cross section and includes a generally horizontal top web 32 and two essentially vertical side flanges 34, 36 extending downwardly from the side edges of the top web 32. These side flanges 34, 36 remain essentially vertical along the entire length of the mandrel 30. A bend line is defined along each top side edge of the mandrel 30 where the top web 32 meets one of the flanges 34, 36. Each of these bend lines is contoured to follow the desired contour of the finished elongated frame member or channel stringer to be formed on the mandrel 30. The orientation of the top web 32 is generally horizontal but varies from the horizontal along the length of the mandrel 30 because of the contouring of the bend lines.

The shape of the mandrel 30 is most clearly illustrated in FIGS. 9 and 9A-9C. These figures illustrate the shape of the finished frame member 60 formed on the mandrel 30. The frame member 60 has an inner channel surface that matches the upper surface of the mandrel 30. The frame member or channel stringer 60 has a top web 62 and side flanges 64, 66 that correspond to the web 32 and flanges 34, 36 of the mandrel 30. The web 62 meets the flanges 64, 66 along elongated contoured bend lines 68, 70, respectively.

The apparatus of the invention also includes a flexible bag that may be inflated into a stretched condition and means for raising and lowering the bag over the mandrel. In the preferred embodiment shown in the drawings, the bag 20 has an elongated generally oblong shape. The bag 20 has a rigid top piece 24 which provides support for the bag 20 and maintains the elongated shape of the bag 20. As shown in the drawings, the bag 20 is preferably provided with a support framework 22 that is attached to the top piece 24 of the bag 20 and that is engaged by the means for raising and lowering the bag 20. The means for raising and lowering the bag may take any of a variety of forms. In the drawings, two ball screw drives 26 are shown that engage the support framework 22. These drives 26 are operated to raise and lower the framework 22 and bag 20 as needed.

Mandrels constructed according to the invention carry a seal that surrounds the perimeter of the upper surface portion of the mandrel and that is engaged by the inflatable bag. In the preferred embodiment shown in the drawings, the seal 38 carried by the mandrel 30 has an elongated saddle shape and forms a continuous loop that runs across the top web 32 of the mandrel 30 at each end of the mandrel 30 and runs along the lower sides of the side flanges 34, 36 of the mandrel 30. The seal 38 is preferably attached to the mandrel by a silicone adhesive. An example of a suitable material for the seal 38 is silicone rubber.

The apparatus of the invention is also provided with means for evacuating the space between the inflatable bag and the mandrel. Preferably, the upper surface portion of the mandrel 30 is vacuum ported, with a number of vacuum ports 42 opening onto the upper surface portion within the seal 38. The evacuating means also includes a vacuum line 40 that extends through a lower portion of the mandrel 30 to communicate with the ports 42 via passageways 44. The vacuum line 40 extends laterally outwardly from the mandrel 30 and is hooked up to a vacuum device (not shown) to provide a vacuum through the upper surface portion of the mandrel 30.

The bag 20 may be made from a number of materials. One such material is silicone rubber. Preferably, the bag 20 has a piece 46 of direct contact breather material bonded thereon. This material 46 is positioned and dimensioned to be within the seal 38 and cover the upper surface portion of the mandrel 30, including vacuum ports 42, when the bag 20 is fully lowered. (See FIG. 7) The material 46 contacts patches 48 of porous material bonded on the surface of the mandrel 30 over the openings of ports 42. Together, the material 46 and the patches 48 provide an air path for the evacuation process described above. The material 46 may be, for example, a silicone rubber impregnated woven material. The patches 48 may be made from, for example, a woven fiberglass cloth.

Figure 2:
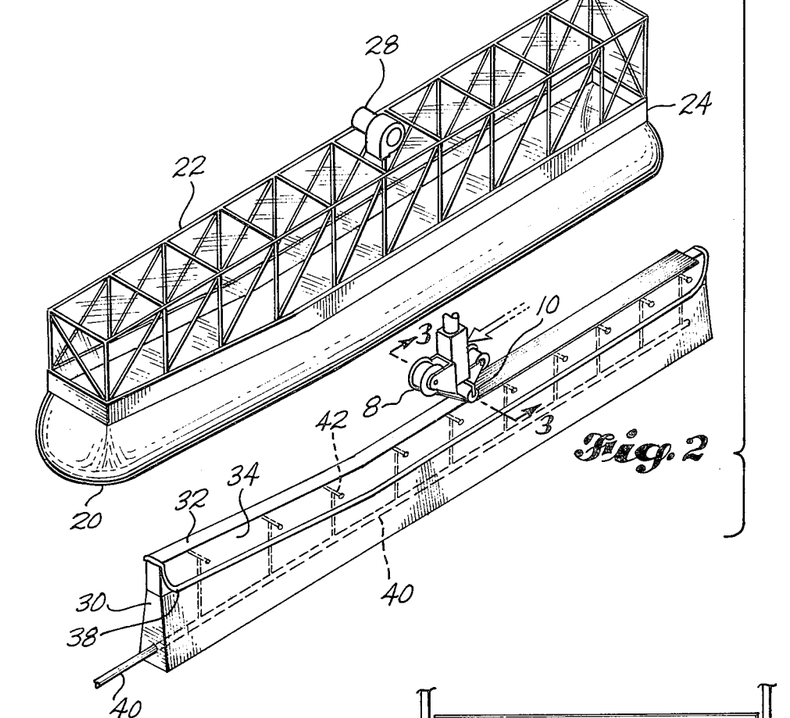
FIG. 2 is a pictorial view of the bag and its support structure, tape laying head, and mandrel shown in FIG. 1.
Figure 3:
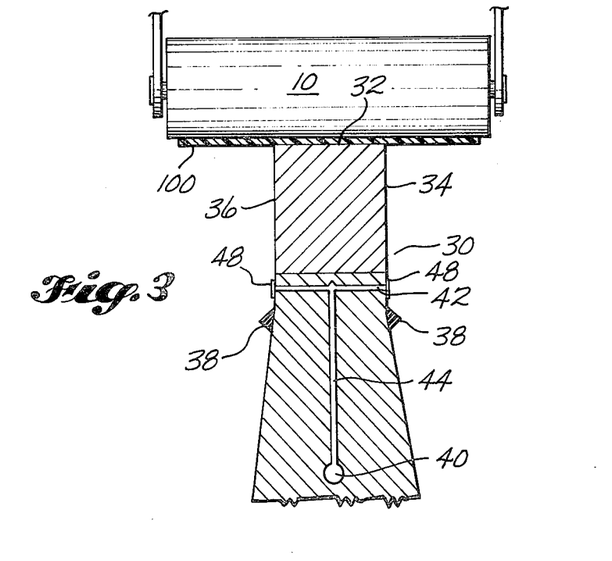
FIG. 3 is a sectional view taken along the line 3—3 in FIG. 2.

The method of the invention and the operation of the apparatus of the invention are illustrated in the drawings. FIGS. 2 and 3 show a ply 100 of fiber reinforced composite material being laid on the mandrel 30. The illustrated tape laying process shows the prepreg tape or ply 100 of material being laid at an angle of 0° to the longitudinal axis of the mandrel 30 and the finished longitudinal member. It is course to be understood that the ply of composite material may be laid in other orientations to attain the desired structural characteristics of the finished longitudinal member. FIGS. 2 and 3 show the ply of tape 100 being laid along the mandrel 30 by the roller 10 of the tape laying head 8. As can be clearly seen in FIG. 3, the web portion of the ply 100 is urged against the top web 32 of the mandrel 30 and the flange portions of the ply are laid in a cantilevered fashion.

Figure 4:
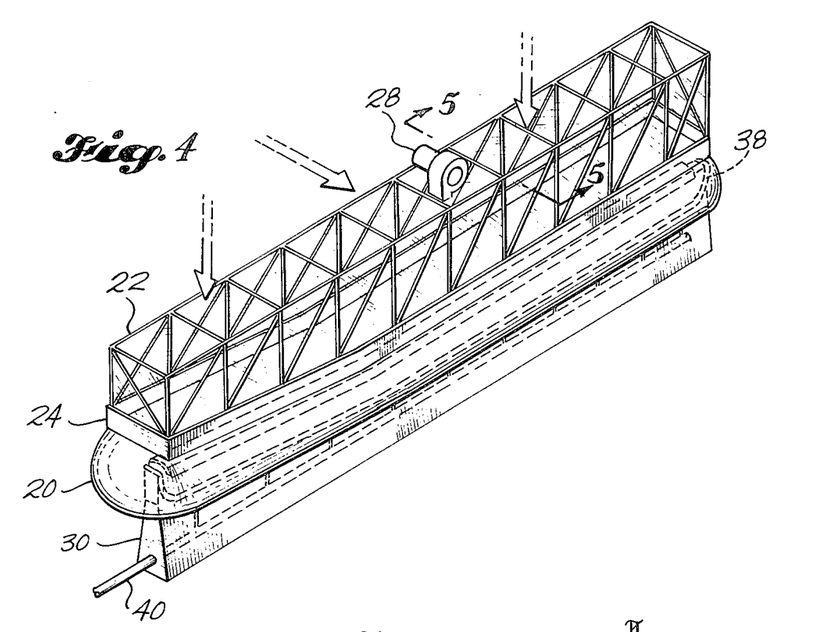
FIG. 4 is like FIG. 2 except that it shows the bag in a position in which the lowering step is near completion.
Figure 5:
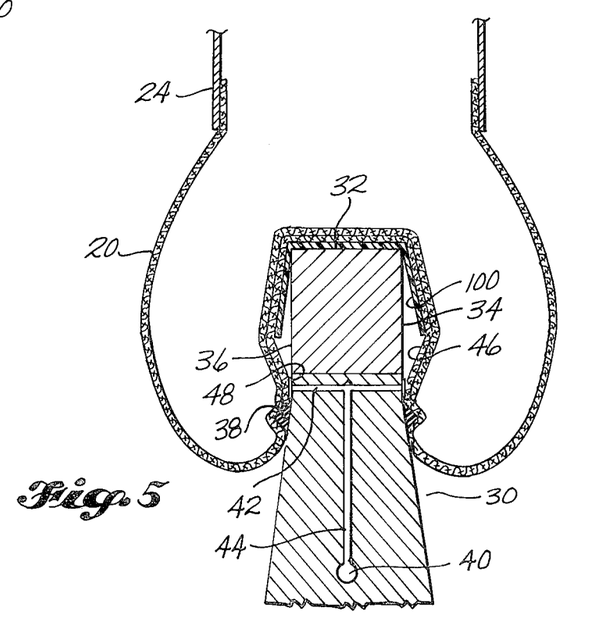
FIG. 5 is a sectional view taken along the line 5—5 in FIG. 4.

After being laid, the cantilevered ply 100 of composite material must be formed to the shape of the mandrel 30. FIGS. 4 and 5 illustrate the bag 20 being lowered down over the mandrel 30 to form the side flange portions of the ply 100 against the side flanges 34, 36 of the mandrel 30. Before the bag 20 is lowered, it is inflated by the use of a blower 28. The inflation of the bag 20 is carried out until the bag 20 is in a stretched condition. This stretching of the bag 20 prevents the formation of wrinkles and bridging and provides smooth contoured bend lines, as described above. The amount of stretch of the bag 20 can be varied by selection of both the blower and the bag material thickness.

As the inflated bag 20 is lowered over the mandrel 30 and the mandrel 30 penetrates the bag 20, the internal air pressure in the bag 20 from the blower 28 forces the bag 20 against the upper surface of the mandrel 30. The bag 20 rolls along the surface of the mandrel 30 and a lower portion of the bag 20 is forced by such internal air pressure against the saddle-shaped seal 38. When the bag 20 is urged against the seal 38, the bag 20 sealingly engages the seal 38 to seal the area between the upper surface of the mandrel 30 and the bag 20 which is described by the seal 38. FIGS. 4 and 5 show the bag 20 just completing its sealing engagement with the seal 38.

Figures 6, 7:
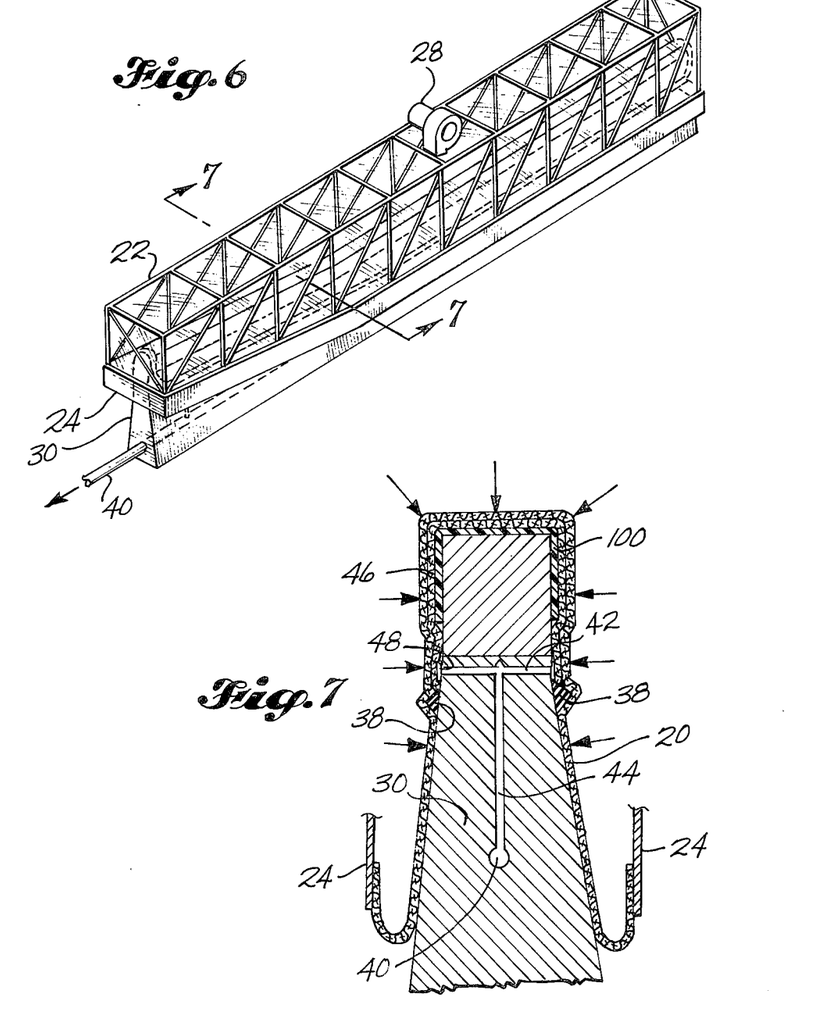
FIG. 6 is like FIG. 4 except that it shows the bag in its fully lowered position and the vacuum compacting process near completion.
FIG. 7 is a sectional view taken along the line 7—7 in FIG. 6.

After the bag 20 has been fully lowered, the area between the mandrel 30 and the bag 20 is evacuated by a vacuum acting through the vacuum line 40 and the ports 42 in the mandrel 30. This area is tightly sealed by the engagement of the bag 20 with the seal 38. The evacuation of this area serves to remove all the entrapped air between the bag 20 and the upper surface of the mandrel 30 and to bring the bag 20 into tighter engagement with the mandrel 30. This compacts the ply 100 of composite material and produces a void free lay-up of the material. FIGS. 6 and 7 illustrate the evacuation process near its completion.

After the ply 100 has been compacted, the bag 20 is raised up out of contact with the ply 100 and mandrel 30. The bag 20 and its support framework 22 are then moved laterally away from the mandrel 30 along end rails 5, and either the tape laying head 8 is brought into engagement with the mandrel 30 to lay the next play of composite material or the side ply dispensing heads 12 are used to dispense the next side plies for application. As can be seen, the method and apparatus of the invention allow for the easy and quick removal of the bag 20 between forming and compacting operations to in turn allow for the automated laying of additional plies of material. As many additional plies of material are laid as necessary to obtain the desired thickness of the finished article. Each of these layers or plies is formed and compacted before laying the next ply. When all of the plies have been laid, formed, and compacted, the formed article is cured. The forming of the article on the mandrel as the plies are being laid has the advantage of providing an article with finished dimensions to thus avoid assembly difficulties while preparing for curing.

Each ply of composite material may of course be laid with its reinforcing fibers oriented in any of a number of desired orientations. The orientation of each ply is, as is well-known, dictated by the required structural characteristics of the finished article. FIG. 8 illustrates a typical lay-up pattern for forming a channel stringer. The plies that cover both the side flanges 34, 36 and the top web 32 of the mandrel 30 are oriented at angles of plus and minus 45° to the longitudinal axis of the stringer. The other plies, the side plies 104, are laid at angles of 0° or 90° to the longitudinal axis. The lay-up pattern shown in FIG. 8 is illustrated and described herein by way of example only. It is only one of a very large number of patterns that might be followed to produce a channel beam having particular desired structural characteristics. It is of course to be understood that the lay-up pattern may be varied to meet the needs of a particular situation.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. Apparatus for forming a composite material article having a desired shape, said apparatus comprising:
    a mandrel having a vacuum ported upper surface portion that conforms to said desired shape;
    a seal carried by the mandrel and surrounding the perimeter of said upper surface portion;
    a flexible bag;
    inflating means for inflating the bag into a stretched condition;
    lowering means for lowering the bag in said condition over said upper surface portion of the mandrel and into sealing engagement with the seal, to form a ply of fiber reinforced composite material that has been laid on said upper surface portion to the shape of said upper surface portion, and for raising the bag out of contact with the mandrel; and vacuum means for evacuating, through said upper surface portion of the mandrel, the area between the bag and the mandrel and within the seal, to compact said ply.

2. Apparatus as described in claim 1, in which said upper surface portion is contoured.

3. Apparatus as described in claim 1, in which said upper surface portion includes an elongated contoured bend line.

4. Apparatus as described in claim 1, in which said upper surface portion is generally U-shaped in cross section, with a top generally horizontal web and two side generally vertical flanges; and said seal is generally saddle-shaped.

5. Apparatus as described in claim 4, in which said upper surface portion includes an elongated contoured bend line between said web and each of said flanges.

6. A method of forming a composite material article, comprising:
   laying a ply of fiber reinforced composite material onto a vacuum ported mandrel having a shape conforming to the desired shape of the article;
   inflating a flexible bag into a stretched condition;
   lowering the inflated bag over the mandrel to form the ply to the shape of the mandrel, and bringing a portion of the bag into sealing engagement with a seal carried by the mandrel around the perimeter of the formed ply;
   applying a vacuum through the mandrel to the area between the bag and the mandrel and within the seal to compact the ply;
   raising the bag to take it out of contact with the mandrel and the ply; and
   laying additional plies of fiber reinforced composite material as necessary to obtain a desired thickness, and forming and compacting each such additional ply before laying another ply.

7. A method as described in claim 6, in which the step of lowering the bag to form the ply includes allowing portions of the bag to unstretch to prevent formation of wrinkles, and allowing other portions of the bag to stretch further to prevent bridging.

8. A method as recited in claim 6, in which the step of lowering the bag to form the ply includes allowing the bag to roll over essentially the entire length of an elongated contoured bend line on the mandrel essentially simultaneously, to fold the ply along said bend line and at the same time restrain the ply from folding along a straight line.

* * * * *

UNITED STATES PATENT AND TRADEMARK OFFICE
CERTIFICATE OF CORRECTION

PATENT NO. : 4,475,976
DATED : October 9, 1984
INVENTOR(S) : Robert F. Mittelstadt and George R. Stumpf, Jr.

It is certified that error appears in the above-identified patent and that said Letters Patent are hereby corrected as shown below:

In the 8th line of the Abstract, "play" should be --ply--.

Column 8, line 10, "play" should be--ply--.

Signed and Sealed this

Thirteenth Day of August 1985

[SEAL]

Attest:

DONALD J. QUIGG

Attesting Officer    Acting Commissioner of Patents and Trademarks